United States Patent [19]
Lowe

[11] Patent Number: 6,058,253
[45] Date of Patent: *May 2, 2000

[54] METHOD AND APPARATUS FOR INTRUSIVE TESTING OF A MICROPROCESSOR FEATURE

[75] Inventor: William M. Lowe, Austin, Tex.

[73] Assignee: Advanced Micro Devices, Inc., Sunnyvale, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/760,968

[22] Filed: Dec. 5, 1996

[51] Int. Cl.$^7$ .................................................. G06F 11/00
[52] U.S. Cl. ........................................................ 395/500.03
[58] Field of Search .............................. 364/488; 371/20; 395/500.03, 500.06

[56] References Cited

U.S. PATENT DOCUMENTS

| | | | |
|---|---|---|---|
| 4,455,654 | 6/1984 | Bhaskar et al. | 371/20 |
| 5,465,216 | 11/1995 | Rotem et al. | 364/488 |
| 5,724,502 | 3/1998 | Cherichetti et al. | 395/183.04 |
| 5,740,183 | 4/1998 | Lowe | 714/736 |

*Primary Examiner*—Paul R. Lintz
*Assistant Examiner*—Thuan Do
*Attorney, Agent, or Firm*—Conley, Rose & Tayon, P.C.; Robert C. Kowert; Kevin L. Daffer

[57] ABSTRACT

A method and apparatus are presented for performing intrusive testing in order to verify proper operation of a microprocessor "feature". The method includes providing a microprocessor model which includes a representation of the feature to be tested. The feature operates in one of several different operating modes as determined by the states of one or more control signals. Intruder logic, configured to restrict operation of the feature to a single desired operating mode, is introduced into the microprocessor model. The microprocessor model executes a testing program which requires operation of the feature and produces a result. The result produced by the microprocessor model is compared to an expected result. Any difference between the result produced by the microprocessor model and the expected result may be due to an error in feature hardware or the portion of the feature control circuitry associated with the selected operating mode. The microprocessor model may be a software implementation (i.e., a set of instructions) or a hardware implementation (i.e., a logic device).

25 Claims, 5 Drawing Sheets

METHOD AND APPARATUS FOR INTRUSIVE TESTING OF A MICROPROCESSOR FEATURE

BACKGROUND OF THE INVENTION

1. Field of the Invention

This invention relates to electronic circuits and more specifically to the functional testing of microprocessors.

2. Description of the Relevant Art

A microprocessor is a complex electronic circuit formed upon a single monolithic semiconductor substrate which executes instructions from a predefined set of instructions. A microprocessor includes interconnected electronic devices (e.g., transistors, resistors, capacitors, and wires) which work together to fetch instructions and data from a main memory unit external to the microprocessor and operate upon the data according to the instructions. The result produced by instruction execution may be stored in the memory unit or sent to a peripheral device coupled to the microprocessor.

Electronic devices which work together to perform a specific function may be grouped together into a subsystem. One or more subsystems which work together to perform a single function may be grouped together into systems (i.e., functional units). The functional units of a microprocessor work together to fetch instructions and data from the main memory unit, and to operate upon the data according to the fetched instructions.

A new microprocessor must offer improved performance over similar existing products in order to be successful in the marketplace. One measure of microprocessor performance is the number of instructions a microprocessor can execute in a given amount of time. One way to increase the performance of a microprocessor is to simply add one or more performance-enhancing "features" to an existing architecture. As defined herein, a "feature" of a microprocessor is a functional unit or subsystem which increases the performance of the microprocessor, and does not contribute directly to any result produced by instruction execution. Thus if a given feature is not present, or is somehow rendered inoperable, the microprocessor remains able to fetch and execute instructions. The result produced by the microprocessor is the same result produced if the feature were present and operable. The amount of time required by the microprocessor to produce the result, however, is increased (i.e., the performance of the microprocessor is reduced). For example, modern microprocessors operate upon data according to an instruction in much less time than it takes to fetch the data from the main memory unit. Thus the performance of the microprocessor may be increased by reducing the number of delays during which needed instructions and data are being fetched from the main memory unit. Many common performance-enhancing features are temporary storage locations for instructions and data which may be accessed quickly, including instruction prefetch buffers, cache memory systems, and write buffers. Other performance-enhancing features include translation lookaside buffer (TLB) subsystems within cache memory systems, additional internal buses to transfer information between microprocessor functional units, and improved bus arbitration mechanisms to increase the efficiencies of the internal buses.

A cache memory system includes a relatively small number of storage locations which can be accessed very quickly. A cache memory system is typically coupled between a bus interface unit and an execution unit of the microprocessor. The bus interface unit is coupled to the main memory unit. The bus interface unit fetches needed quantities from and stores data to the main memory unit, and the execution unit performs instruction execution. The cache memory system stores instructions or data which have been recently used, or have a high probability of being required in the near future, making them readily available to the execution unit. A typical cache memory system is organized internally as several cache "lines," each of which is several bytes in length. When a needed instruction or datum (i.e., a needed quantity) is not found in the cache memory system, the bus interface unit fetches a number of bytes corresponding to the length of a cache line and including the needed quantity from the main memory unit. The entire cache line is stored in the cache memory system. The overall performance of the microprocessor is improved when needed quantities are often found within the cache memory system, eliminating the need for time-consuming accesses to the main memory unit.

An instruction prefetch buffer is a holding area for instructions which follow the instruction currently being executed by the execution unit. The instruction prefetch buffer includes a relatively small number of storage locations, and is coupled between the bus interface unit and the execution unit. If a microprocessor includes a cache memory system, the instruction prefetch buffer is typically coupled between the cache memory system and the execution system. The amount of time required to fetch an instruction from the instruction prefetch buffer is much less than the time required to obtain the instruction from either the cache memory system or the main memory unit. When instructions following the current instruction are not present within the cache memory system, the bus interface unit fetches the instructions from the main memory unit in advance of their being needed by the execution unit. Without an instruction prefetch buffer, or if the instruction prefetch buffer were somehow made inoperable, relatively long delays would be incurred following the completion of the execution of each instruction while the microprocessor fetches the next instruction from the cache memory system or the main memory unit. Thus the presence of the prefetch buffer improves the performance of the microprocessor by reducing delays incurred in the fetching of needed instructions.

A write buffer includes a relatively small number of storage locations for storing execution results waiting to be written to the main memory unit. Without a write buffer, the microprocessor must wait until time-consuming write operations which store data within the main memory unit are completed before continuing with instruction execution. The write buffer allows temporary storage of pending stores (i.e., writes) to the main memory unit. The pending writes are completed when the microprocessor is not obtaining needed instructions or data from the main memory. With a write buffer, the microprocessor is able to continue with instruction execution in a much shorter period of time following writes to the main memory unit. The presence of the write buffer thus improves the performance of the microprocessor by reducing delays incurred during writes to the main memory unit.

Modern microprocessors support a memory management technique called paging. Paging allows access to a physical address space which may be larger than the number of storage locations within the main memory unit. Paging divides the physical address space into smaller units called pages. Only pages which contain the most recently used instructions and data are stored within the main memory unit. The remaining pages are stored in a mass storage unit external to the main memory unit (e.g., a disk drive).

In order to adequately support paging, a cache memory systems typically include TLBs. Paging support typically requires information from two different tables stored within the main memory unit (i.e., a page directory and a page table). Values stored within the page directory and the page table are used to determine the physical address of a memory location. The physical address of a memory location is also required to access information within the cache memory system. A TLB, itself a cache memory system, stores the most recently used page table entries. The amount of time required to access a page table entry in a TLB is much less than the time required to obtain the page table entry from the main memory unit. Overall microprocessor performance is increased since the page table entries are often found in the readily accessible TLB, thereby reducing the required number of time-consuming accesses to the main memory unit.

Although the operations of performance-enhancing features should affect only the overall performance of the microprocessor, it is possible for a design error or a manufacturing defect within a performance-enhancing feature to cause a microprocessor to fail to produce a correct program result. Such an error may be present in the electronic devices (i.e., the hardware) which make up the feature, or within the control circuitry of the feature. For example, an error in the hardware of an instruction prefetch buffer, a cache memory system, or a write buffer, may cause the feature to introduce an error into quantities stored therein, thereby causing the microprocessor to produce an incorrect result. In addition, an error in the hardware or control circuitry of an instruction prefetch buffer may cause the buffer to provide instructions out of the intended program sequence, thereby causing the microprocessor to produce an incorrect result. An error in the hardware or control circuitry of a write buffer may cause a stored quantity to be saved in the wrong storage location within the main memory unit, thereby causing the microprocessor to produce an incorrect result.

Functional testing is typically performed to ensure a given microprocessor operates correctly. Such functional testing typically includes placing the microprocessor under test in a known internal state, applying known input signals, and comparing the response of the microprocessor to a predetermined "correct" response (i.e., an expected response). The expected response is typically derived from a list of functional requirements of the microprocessor (i.e., a functional specification of the microprocessor). Any deviation of the microprocessor response from the expected response represents a failure of the functional test.

Performance-enhancing features are tested using a technique called "intrusive testing". Intrusive testing is also used to test logic that detects the presence of outdated (i.e., "stale") information within the cache memory system, logic that arbitrates for control of the internal buses, and the synchronization between the functional units of a microprocessor. A given performance-enhancing feature typically operates according to one of several predefined methods of operation (i.e., in one of several different operating modes) as determined by the states of one or more control signals. Intrusive testing typically involves placing the feature under test into a desired operating mode, then causing the microprocessor to execute a testing program which requires operation of the feature and produces a result. Any difference between the result produced by the microprocessor and the expected result may be due to an error or defect within the hardware or control circuitry of the feature.

An intrusive testing program, executed by the microprocessor under test during the intrusive test, consists of two parts. A first part of the testing program includes software instructions which initiate the desired operating mode of the feature. A second part of the testing program includes software instructions which require operation of the feature and produce a result. The result produced by the microprocessor may then be compared to the expected result.

A significant amount of the total intrusive test generation effort is expended in writing the first part of the testing program which initiates the desired operating mode of the feature. The highly complex nature of modern microprocessors and the large amounts of data manipulation involved make generation of the first part of the testing program both cumbersome and error prone. An undiscovered error in the first part of the testing program may fail to place the selected feature in the desired operating mode. As a result, the entire intrusive test is flawed. The faulty test will fail to accomplish its goal. Furthermore, the result obtained by executing the test may erroneously indicate that the feature is or is not functioning correctly. An additional problem is created when the internal logic of a microprocessor is revised or changed. In this case, a testing program which functioned correctly prior to the logic modification may fail to initiate the desired operating mode of the feature.

It would thus be desirable to have an intrusive test methodology for architectural feature verification which decouples the task of initiating the desired operating mode of a feature under test from the task of verifying proper feature operation, and also simplifies the task of initiating the desired operating mode of the feature being selected.

SUMMARY OF THE INVENTION

The problems outlined above are in large part solved by a method and apparatus for performing intrusive testing in order to verify proper operation of a "feature" of a microprocessor. Such features typically increase the performance of the microprocessor. Examples of such features include instruction prefetch buffers, cache memory systems, write buffers, and TLBs. The method includes providing a model of the microprocessor which includes a representation of the feature to be tested. A microprocessor feature typically operates in one of several predefined operating modes as determined by the states of one or more control signals. "Intruder logic" is introduced into the microprocessor model which functions as to restrict operation of the feature to a single desired operating mode. The intruder logic may do so by intercepting and altering one or more control signals produced by control circuitry of the feature, or by intercepting and altering one or more input signals to the control circuitry. The microprocessor model is caused to execute a testing program which requires operation of the feature and produces a result. The result produced by the microprocessor model is compared to an expected result. Any difference between the result produced by the microprocessor model and the expected result may be the result of an error within the feature hardware or within the portion of the feature control circuitry associated with the selected operating mode.

The use of intruder logic effectively decouples the task of initiating the desired operating mode of a feature under test from the task of verifying proper feature operation. Configured to intercept and alter one or more input or output signals of feature control circuitry, the intruder logic exercises direct control over feature operation. As a result, the intruder logic is an effective and efficient means of initiating a desired feature operating mode. Many of the complexities of the microprocessor which must be dealt with by a corresponding first part of an intrusive testing program are eliminated. The task of initiating the desired operating mode of the feature is thereby simplified, and the margin for error reduced.

The microprocessor model may use software instructions to simulate the operations of functional units (i.e., systems) and subsystems of the microprocessor being modeled. Alternately, the microprocessor model may use interconnected electronic devices to emulate the operations of the functional units and subsystems. The microprocessor model may thus be implemented in software or hardware. A software implementation of the microprocessor model includes a set of instructions from a defined programming language or a hardware design language. Suitable programming languages include C and C++. Suitable hardware design languages include Verilog and the VHSIC hardware description language (VHDL). A hardware implementation of the microprocessor model may be formed by programming a programmable logic device (PLD) according to a functional specification of the microprocessor to be modeled. Suitable PLDs include various types of programmable logic arrays (PLAs) and field programmable gate arrays (FPGAs).

The microprocessor model functions as a part of a microprocessor test group. The microprocessor test group includes the microprocessor model, a memory model, a bus model coupled between the microprocessor model and the memory model, and a test engine. The memory model is configured to store data, and also includes memory control registers used to generate control signals. The bus model facilitates the transfer of data between the microprocessor model and the memory model, and includes representations of address signal lines, data signal lines, and control signal lines. The test engine is configured to initiate execution of the testing program by the microprocessor model and to check for proper operation of the other elements of the microprocessor test group during execution of the testing program. The bus model, the memory model, and the test engine are implemented in software.

Software elements of the microprocessor test group are contained within a memory unit of a microprocessor testing system during testing. The microprocessor testing system includes a central processing unit (CPU), chip set logic, a system bus, a memory bus, and a memory unit. The CPU is configured to execute instructions. The system bus is adapted for coupling to one or more peripheral devices. The chip set logic forms an interface between the CPU and the system bus, and between the CPU and the memory bus. The memory bus is used to transfer data between the CPU and the memory unit via the chip set logic. The memory unit is coupled to the memory bus and is configured to store data. In a first embodiment of the microprocessor testing system, the microprocessor model is a software implementation, and all of the elements of the microprocessor test group are contained within the memory unit of the microprocessor testing system during testing. In a second embodiment of the microprocessor testing system, the microprocessor model is a separate hardware implementation coupled to the bus model and to the test engine, and the remaining elements of the microprocessor test group are contained within the memory unit of the microprocessor testing system during testing. In both embodiments, the microprocessor model includes the intruder logic configured to restrict operation of the feature to a single operating mode.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

A feature of a microprocessor typically operates in one of several different operating modes dependent upon the states of one or more control signals. Intrusive testing of the feature involves restricting the operation of the feature to one of the several different operating modes. The ability to manipulate the control signals is therefore necessary to perform intrusive testing. The control signals of a feature, however, are typically internal to the microprocessor and not directly accessible. Accordingly, the first step in the present intrusive testing of a microprocessor feature is to provide a model of the microprocessor. The microprocessor model affords the necessary access to the one or more control signals which determine the operating mode of the feature. Intruder logic is introduced into the microprocessor model. The intruder logic functions as to restrict operation of the selected feature to a predetermined operating mode. The intruder logic may intercept and alter one or more control signals produced by control circuitry of the feature, thereby restricting operation of the feature to a predetermined operating mode. Alternately, the intruder logic may intercept and alter one or more input signals to the control circuitry, thereby restricting operation of the feature to a predetermined operating mode. It is noted that introduction of the intruder logic must result in "allowable" (i.e., defined) input signals to the control circuitry. After the intruder logic is introduced, the microprocessor model is caused to execute a testing program which requires operation of the feature (i.e., exercises the feature) and produces a result. The result produced by the microprocessor model is then compared to an expected result. Any difference between the result produced by the microprocessor model and the expected result may indicate an error in the feature or in related control circuitry.

Figure 1:
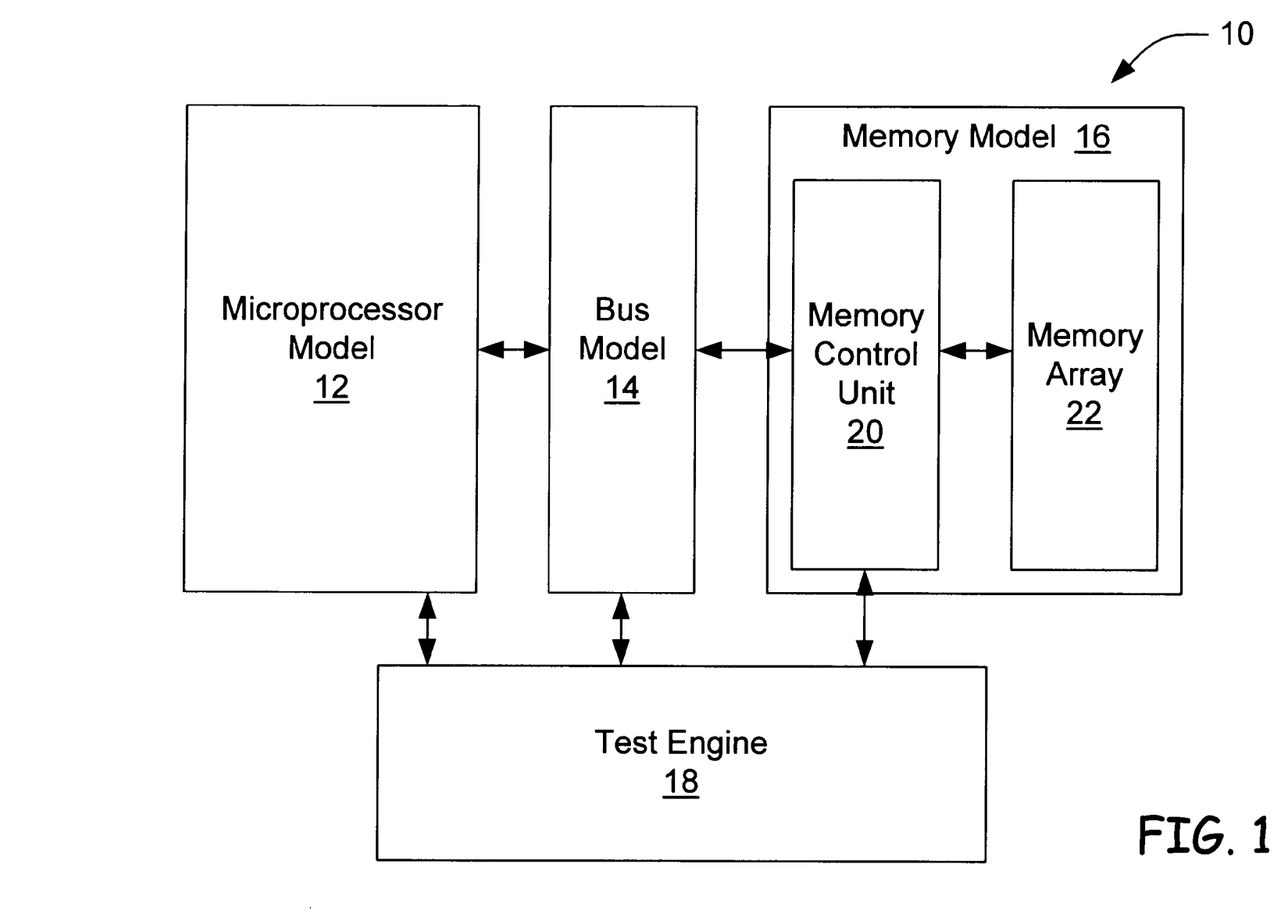
FIG. 1 is a block diagram of a microprocessor test group including a model of a microprocessor containing a feature to be tested, software memory and bus models which provide operational support for the microprocessor model, and a test engine which initiates execution of a testing program by the microprocessor model and checks for proper operation of the microprocessor, memory, and bus models during testing program execution.

FIG. 1 is a block diagram of a microprocessor test group 10. Microprocessor test group 10 includes a microprocessor model 12, a bus model 14, a memory model 16, and a test engine 18. Microprocessor model 12 is a model of a microprocessor as described above. Microprocessor model 12 is a model of a microprocessor and is configured to execute instructions, preferably x86 instructions. Memory model 16 is a model of a memory system, and is configured to store data. Memory model 16 also includes a special functional unit described below which generates control signals. The special functional unit also generates a system clock signal CLK which coordinates the activities of microprocessor model 12, bus model 14, and memory model 16. Bus model 14 models a bus system, and includes representations of address signal lines, data signal lines, and control signal lines. Bus model 14 is used to transfer instructions and data between microprocessor model 12 and memory model 16. Microprocessor model 12 is coupled to bus model 14, and bus model 14 is coupled to memory model 16. Microprocessor model 12 fetches data (i.e., reads) from memory model 16 via bus model 14, and stores data (i.e., writes) to memory model 16 via bus model 14.

Test engine 18 is coupled to microprocessor model 12, bus model 14, and memory model 16. Test engine 18 is configured to initiate execution of the testing program by microprocessor model 12 and to check for proper operation of the other elements of microprocessor test group 10 during execution of the testing program. For example, test engine 18 may check for proper bus transactions between microprocessor model 12 and memory model 16 via bus model 14 during execution of the testing program. Test engine 18 may also check for operation of microprocessor model 12 in proper states during execution of the testing program. It is noted the test engine 18 may be replaced by additional instructions within the testing program which cause microprocessor model 12 to perform the above functions and store the results within memory model 16 for later verification.

Microprocessor model 12 may be implemented in hardware or software. A software implementation of microprocessor model 12 includes a set of instructions from a defined programming language or a hardware design language. Suitable programming languages include C and C++. C and C++ are classified as high-level computer programming languages along with FORTRAN, COBOL, BASIC, Pascal, and Ada. C and C++ statements (i.e., instructions) and associated data may be grouped together into functions which represent the operations performed by functional units and subsystems of a microprocessor. A computer program called a compiler is typically used to translate C and C++ programs into machine language instructions of the processor of the computer system upon which the compiled program will be executed. In a similar manner, the C or C++ instructions included in a model of a microprocessor are compiled into machine language instructions of the processor of the computer system upon which they will be simulated. Simulation of a software implementation of a microprocessor model involves loading the compiled instructions and associated data of the microprocessor model into the main memory unit of a computer system, providing a set of instructions and data (i.e., a testing program) which the microprocessor model may access, and initiating execution of the testing program by the microprocessor model.

In a programming language such as C and C++, a signal may be represented as a value stored in one or more bit positions of a multiple-bit storage location within a memory unit. For example, a 16-bit storage location may be used to store as many as 16 single-bit signal values, each of which may be in one of two logic states (e.g., either a logic '0' state or a logic '1' state). Furthermore, the storage location as a whole may represent a bus structure with 16 separate signal lines, each of which may be in either a logic '0' state or a logic '1' state. Alternately, the storage location may be used to represent one 16-bit register, two 8-bit registers, etc. Storage locations of a memory unit may be modeled as a declared array.

Functional units and subsystems may be modeled behaviorally, algorithmically, or structurally. A behavioral model of a functional unit or subsystem includes a set of equations which generate output signals from the values of input signals. An algorithmic model of a functional unit or subsystem generates the values of output signals from the values of input signals according to a predefined sequence of steps. A structural model of a functional unit or subsystem includes a group of interconnected logic gate models which generate output signals from the values of input signals. The logic gates themselves may be represented structurally, behaviorally, or algorithmically. For example, a subsystem which generates an output signal 'c' from input signals 'a' and 'b' according to the exclusive OR function may be modeled behaviorally using:

$$c = a \oplus b$$

where '$\oplus$' is the exclusive OR operator. The same subsystem may be modeled algorithmically by initializing the logic value of 'c' to '0', summing the logic values of 'a' and 'b', and setting the value of 'c' to '1' only if the sum is equal to '1'. A structural model of the subsystem may be formed using models of a two-input OR gate, a two-input NAND gate, and a two-input AND gate. The inputs to the OR gate and the NAND gate models are signals 'a' and 'b', the output of the NOR gate model is one input to the AND gate model, and the output of the NAND gate model is the other input to the AND gate model. The output of the AND gate model is 'c', where the value 'c' is determined by the interconnected logic gate models and is equal to 'a $\oplus$ b'.

A hardware design language may also be used to implement a software implementation of microprocessor model 12. Suitable hardware design languages include Verilog and the VHSIC hardware description language (VHDL). Hardware description languages are high-level languages specifically adapted to model electronic circuits and systems. Verilog is patterned after the C programming language, and VHDL is patterned after the Ada programming language. Verilog and VHDL include built-in hardware constructs such as signals ('events' in Verilog), standard logic gates, registers, and buses. Built-in functions model standard logic gates in VHDL and Verilog. During simulation, the output signals produced by modeled logic gates are determined from the values of the input signals. Signals in VHDL and events in Verilog are defined and manipulated just as variables are defined and manipulated in a high-level programming language. A bus is normally represented as a declared linear array (i.e., a vector) of storage locations within a memory unit. The storage locations store the logic states of the signal lines of the bus (e.g., '0', '1', and 'Z', where 'Z' is a high-impedance state). Storage locations of memory units may be modeled as declared arrays. Functional units and subsystems may be modeled behaviorally, algorithmically, or structurally as described above. Software models written in Verilog or VHDL are typically simulated as described above. The software model may also be "translated" into geometric data which completely describes the layout of an integrated circuit which performs the functions of the model (i.e., a hardware implementation of the model) by a computer program referred to as a silicon compiler or synthesizer.

A hardware implementation of microprocessor model 12 may be formed by programming a programmable logic device (PLD) according to a functional specification of the microprocessor to be modeled. PLDs are general-purpose digital components which are manufactured in an "unprogrammed" state, and are later "programmed" to implement a desired logical function. A PLD is typically programmed by a sequence of electrical pulses which configure an array of switches within the PLD. Suitable PLDs include various types of programmable logic arrays (PLAs) and field programmable gate arrays (FPGAs). A PLA is a PLD having at least one array of internal switches which may be configured to implement any combinational logic function as a sum of product terms (i.e., a sum of products) of one or more input signals. FPGAs are semi-custom logic devices including "islands" of programmable logic blocks called "logic cells" surrounded by an interconnection network which includes programmable switches. The logical functions performed by the logic cells are determined by programming, as are the interconnections formed between the logic cells. PLAs and FPGAs may also include storage elements called flip-flops.

Bus model 14, memory model 16, and test engine 18 are typically implemented in software, and reside in a memory unit of a microprocessor testing system during use. Software implementations include a set of instructions from a defined programming language or a hardware design language as described above. Bus model 14, memory model 16, and test engine 18 are preferably implemented in a suitable hardware design language such as Verilog or VHDL. Bus model 14 includes storage locations which represent address signal lines, data signal lines, and control signal lines. Memory model 16 includes a memory control unit 20 and a memory array 22. Memory array 22 is configured to store data and includes storage locations of the memory unit. Memory control unit 20 includes software instructions which save data to, and retrieve data from, storage locations within memory array 22. Memory control unit 20 also includes a special functional unit described below which generates control signals and the system clock signal CLK.

Figure 2:
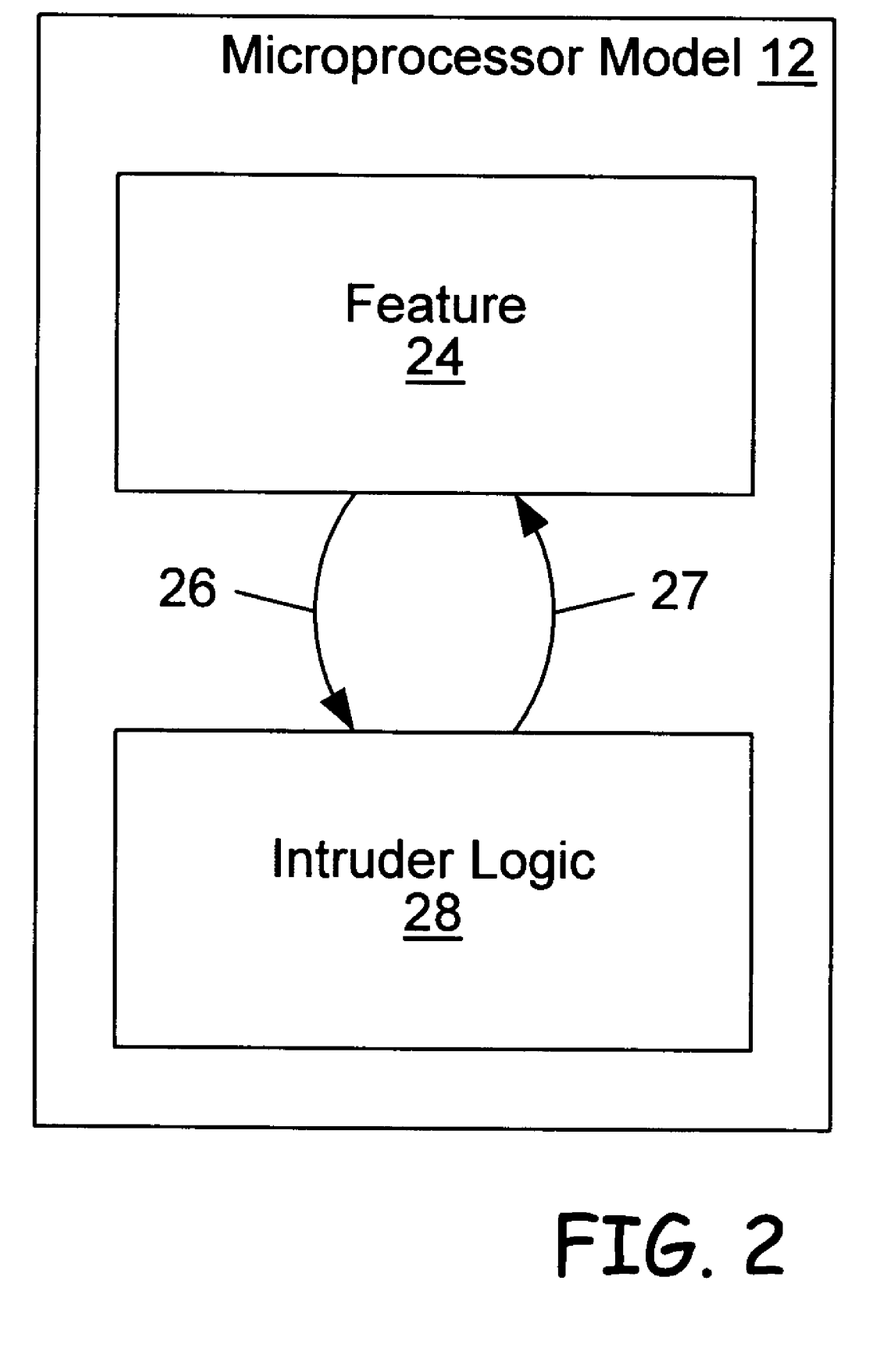
FIG. 2 is a block diagram of a preferred embodiment of a microprocessor model of the microprocessor test group of FIG. 1, the microprocessor model including a feature to be tested and intruder logic configured to determine the operating mode of the feature.

Microprocessor model 12 includes one or more features which are subject to intrusive testing performed by the microprocessor testing system. FIG. 2 is a block diagram of a preferred embodiment of microprocessor model 12 which includes a feature 24 and intruder logic 28. Feature 24 is subject to intrusive testing. Examples of suitable features include instruction prefetch buffers, cache memory systems, write buffers, and TLBs as described above. The operation of feature 24 is controlled by one or more control signals generated by control circuitry of feature 24. Feature 24 operates in one of many possible operating modes as determined by the logic values of the one or more control signals. Intruder logic 28 includes software instructions (in a software implementation of microprocessor model 12) or logic circuitry (in a hardware implementation of microprocessor model 12) designed to cause feature 24 to operate in a predetermined operating mode during operation of microprocessor model 12. Intruder logic 28 may intercept and alter one or more control signals produced by control circuitry of the feature, thereby restricting operation of feature 24 to the predetermined operating mode. Alternately, intruder logic 28 may intercept and alter one or more input signals to the control circuitry, thereby restricting operation of feature 24 to the predetermined operating mode. In addition, intruder logic 28 may intercept and alter control signals produced by the control circuitry and input signals to the control circuitry, thereby restricting operation of feature 24 to the predetermined operating mode. All three cases are covered by the representation shown in FIG. 2 wherein intruder logic 28 receives one or more signals 26 from feature 24, produces one or more signals 27 in response to the one or more signals 26, and provides the one or more signals 27 to feature 24. Signals 26 may be control signals produced by the control circuitry of the feature, input signals to the control circuitry of the feature, or a combination of both. Signals 27 may be modified control signals, modified input signals, or a combination of both.

During testing, microprocessor model 12 executes a testing program which requires operation of feature 24 and produces a result. The testing program includes instructions from an instruction set of microprocessor model 12 along with associated data. Intruder logic 28 causes the selected operating mode of feature 24 to be exercised exclusive of all other operating modes. Any error existing within feature 24 and associated with the selected operating mode may cause the result produced by microprocessor model 12 to differ from an expected result. Several examples of possible implementations of intruder logic 28 are described below.

Memory control unit 20 includes several control registers which are configured to store data. This data includes key operating parameters and status information regarding special functions which aid in the functional testing of microprocessor model 12. A special functional unit within memory control unit 20 uses information stored within the control registers to generate control signals. Such control signals may include interrupt signals, cache control signals, and bus arbitration signals. Examples of common x86 interrupt signals include non-maskable interrupt (NMI), maskable interrupt (INTR), reset (RESET), and stop clock (STPCLK#). Cache control signals include cache enable (KEN#) and cache flush (FLUSH#). Examples of common bus arbitration signals include bus hold request (HOLD) and backoff (BOFF#). Generated control signals are stored in corresponding storage locations of bus model 14 which represent control signal lines.

Several examples of possible implementations of intruder logic 28 will now be described. A first example involves an implementation of intruder logic 28 used to test aspects related to the operation of a TLB feature. As described above, cache memory systems include TLBs to reduce the amount of time required to convert one form of an address representation (i.e., a linear address) to a physical address in memory. In order to test the operation of a TLB feature, intruder logic 28 may include software instructions (in a software implementation of microprocessor model 12) or logic circuitry (in a hardware implementation of microprocessor model 12) to monitor a control signal which is asserted when a needed page table entry is found in the TLB, and to deassert the control signal when the control signal is asserted (i.e., to ensure the control signal is always deasserted). As microprocessor model 12 executes a set of software instructions which produce a result, the needed page table entry is always fetched from the main memory and stored in the TLB. Thus the operations of the page table entry fetch mechanism and the TLB storage mechanism are exercised, and the likelihood that any error in the page table entry fetch mechanism or the TLB storage mechanism will cause the result to differ from an expected result is increased.

Microprocessor model 12 may execute the set of software instructions at a slower rate, but the result produced by microprocessor model 12 should not differ from the expected result. Any difference between the result produced by microprocessor 12 and the expected result represents a failure of the intrusive test. Such a test failure may signal an error in the TLB feature (i.e., an error in the TLB hardware or an error within the portions of the TLB control circuitry associated with the page table entry fetch mechanism and the TLB storage mechanism).

It is noted that in the above first example, all of the TLB storage locations will quickly become filled with copies of page table entries fetched from the main memory unit. When a needed page table entry is not found within the TLB, and all of the TLB storage locations are full, the fetched page table entry replaces a page table entry stored within the TLB according to a replacement algorithm. The replacement algorithm is part of the TLB storage mechanism and determines how new page table entries replace existing page table entries within the TLB. The replacement algorithm represents a resource allocation mechanism. Such resource allocation mechanisms are typically relatively complex, and have a correspondingly greater probability of containing an error.

Second and third examples of a possible implementation of intruder logic 28 involve other operations of a cache memory system. As described above, many modern microprocessors include one or more cache memory systems to reduce the amount of time required to fetch a needed quantity (i.e., an instruction or a datum) from a main memory unit. The amount of time required to fetch a needed quantity from the cache memory system is much less than the amount of time required to fetch the quantity from the main memory unit. When a microprocessor includes a cache memory feature, access to the main memory unit is only required if the needed quantity is not located in the cache memory system. As a result, the average time required to fetch a needed quantity is substantially reduced. When a needed quantity is not found in the cache memory system, the quantity is fetched from the main memory unit, and the fetched quantity is subsequently stored in the cache memory system.

In the second example, intruder logic 28 includes software instructions or logic circuitry to monitor a control signal which is asserted when a needed quantity is found in the cache memory system, and to deassert the control signal when the control signal is asserted (i.e., to ensure the control signal is always deasserted). As microprocessor model 12 executes a set of software instructions which produces a result, needed quantities are always fetched from the main memory unit, and the needed quantities are always stored in the cache memory system. Thus the operations of the main memory fetch mechanism and the cache memory storage mechanism are exercised, and any error in the either the main memory fetch mechanism or the cache memory storage mechanism may cause the result to differ from an expected result. As before, microprocessor model 12 may execute the set of software instructions at a slower rate, but the result produced by microprocessor model 12 should not differ from the expected result. Any difference between the result produced by microprocessor model 12 and the expected result may signal an error in the cache memory system hardware or in the portions of the cache memory control system associated with the main memory fetch mechanism and the cache memory storage mechanism.

It is noted that all of the cache memory system storage locations will quickly become filled with copies of quantities fetched from the main memory unit. A replacement algorithm, which is part of the cache memory system storage mechanism, determines how quantities replace existing quantities within the cache memory system. The replacement algorithm represents a resource allocation mechanism. As described above, such relatively complex resource allocation mechanisms have a correspondingly greater probability of containing an error.

In the third example, intruder logic 28 includes software instructions or logic circuitry to toggle a WriteBack/Write-Through (WB/WT#) cache control signal line in order to exercise logic associated with the write-back and write-through cache operating modes. The WB/WT# cache control signal line is typically used to allow hardware external to the microprocessor (i.e., system hardware) to define a cache line as operating in a write-back mode or a write-through mode. When the WB/WT# cache control signal line is driven to a logic 1 during a write operation, the associated cache line is identified as operating in the write-back mode. When the WB/WT# cache control signal line is driven to a logic 0 during a write operation, the associated cache line is identified as operating in the write-through mode. When a cache line is operating in the write-back mode, data write operations involve only memory locations in the cache memory system. Modified cache lines are saved to corresponding locations in the main memory unit only when they are replaced. When a given cache line is operating in a write-through mode, data produced by the microprocessor is written to both the cache memory system and to the main memory unit. The control circuitry of the cache memory system operates hardware of the cache memory system to implement a write-back mechanism in the write-back mode, and a write-through mechanism in the write-through mode. Intruder logic 28 is configured to alternately drive the WB/WT# cache control signal line to a logic 0 during one data write operation, and to a logic 1 level during the next data operation. As microprocessor model 12 executes a testing program, the write-back and write-through mechanisms of the cache memory system are exercised. An error in either the write-back mechanism or the write-through mechanism may cause the result produced by microprocessor model 12 to differ from an expected result. Any difference between the result produced by microprocessor 12 and the expected result may signal an error in the hardware associated with the write-back and write-through mechanisms, or in the portions of the cache memory system control circuitry which implement the write-back and write-through mechanisms.

Figure 3:
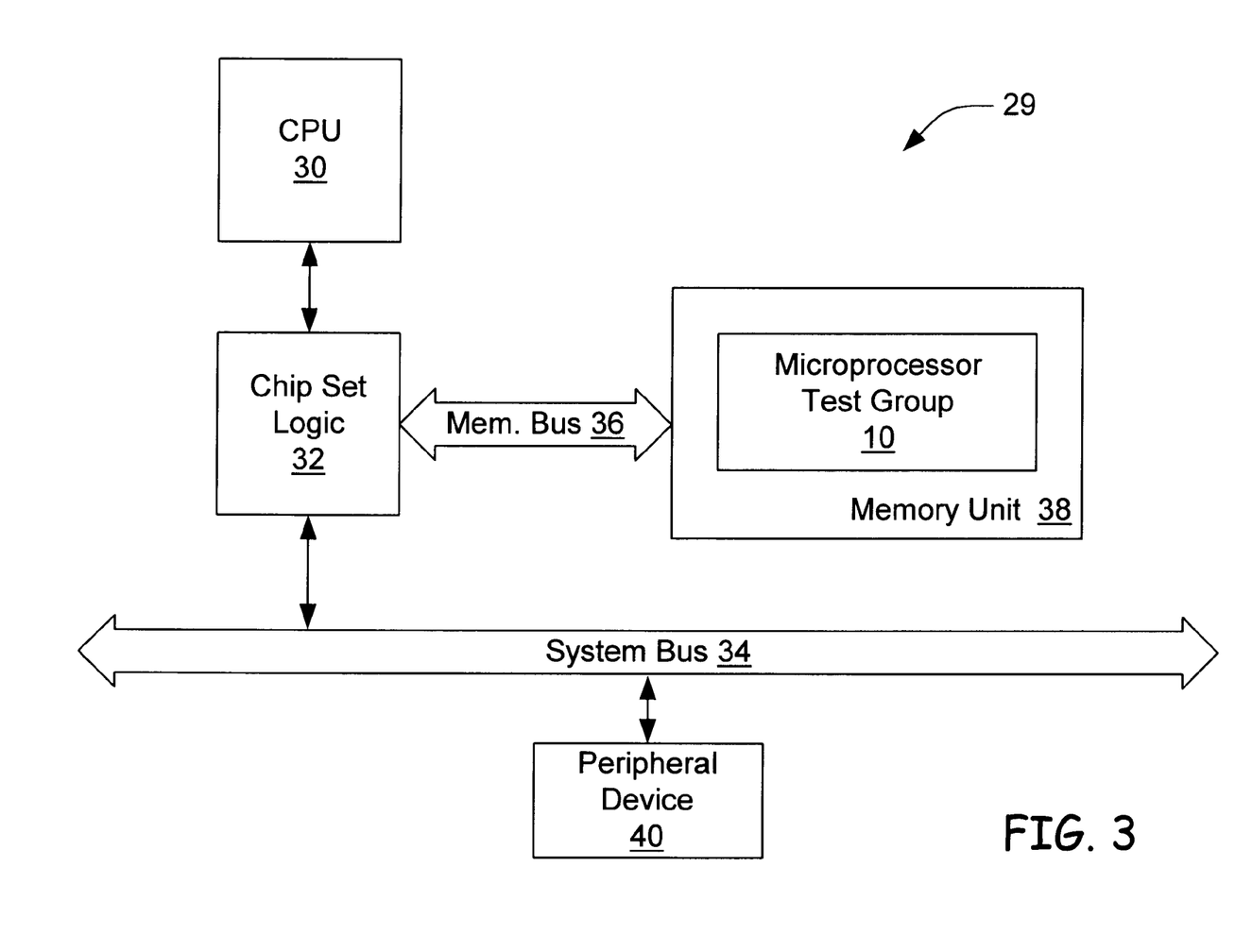
FIG. 3 is a block diagram of a first embodiment of a microprocessor testing system including a software implementation of the microprocessor model, the microprocessor model including a feature to be tested and intruder logic configured to determine the operating mode of the feature.

FIG. 3 is a block diagram of a first embodiment of a microprocessor testing system. Microprocessor testing system 29 is an actual computer system which exercises the software elements of microprocessor test group 10. In the embodiment of FIG. 3, microprocessor test group 10 includes a software implementation of microprocessor model 12. Microprocessor testing system 29 includes a central processing unit (CPU) 30 coupled to chip set logic 32. Chip set logic 32 is coupled to a system bus 34 and a memory bus 36. A memory unit 38 is coupled to memory bus 36. A peripheral device 40 may be coupled to system bus 34. CPU 30 obtains data (i.e., reads) from memory unit 38 via chip set logic 32, and stores data (i.e., writes) to memory unit 38 via chip set logic 32. Chip set logic 32 functions as interface between CPU 30 and system bus 34, and between CPU 30 and memory unit 38. Chip set logic 32 preferably includes a memory controller. Memory unit 38 is configured to store data, and preferably includes semiconductor memory devices. Peripheral device 40 may be a disk drive unit, a video display unit, or a printer. Memory unit 38 includes microprocessor test group 10 described above. Microprocessor model 12 of test group 10 is thus a software implementation including instructions. During use, microprocessor model 12 is caused to execute a testing program. The testing program includes a set of instructions which require operation of the feature and produce a result. The result produced by the microprocessor model is compared to an expected result. Any difference between the result produced by the microprocessor model and the expected result may indicate an error in feature hardware or in the control circuitry of the feature.

Figure 4:
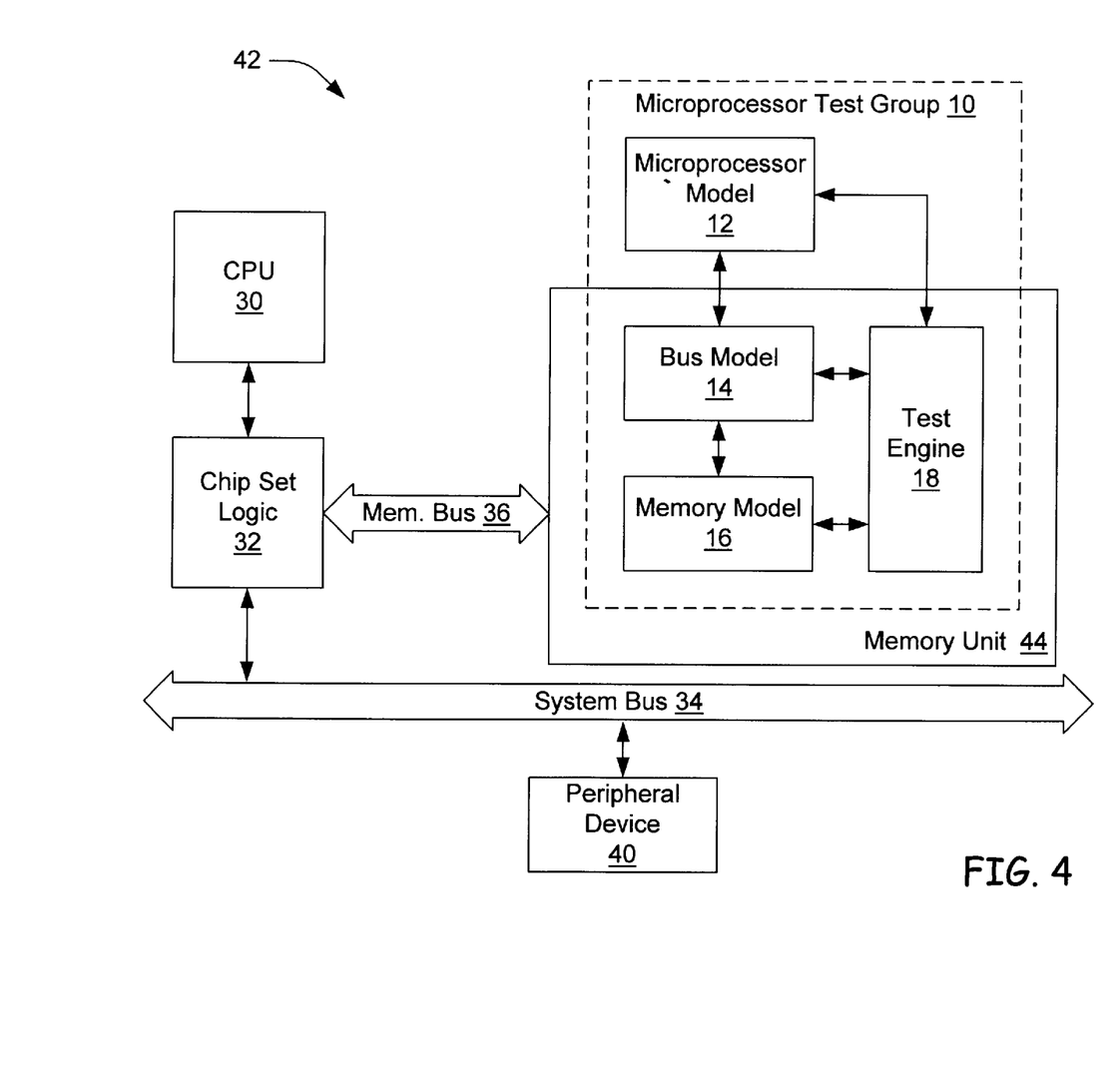
FIG. 4 is a block diagram of a second embodiment of a microprocessor testing system including a hardware implementation of the microprocessor model, the microprocessor model including a feature to be tested and intruder logic configured to determine the operating mode of the feature.

FIG. 4 is a block diagram of a second embodiment of a microprocessor testing system. Microprocessor testing system 42 is an actual computer system which exercises the software and hardware elements of microprocessor test group 10. Microprocessor testing system 42 includes a hardware implementation of microprocessor model 12. Microprocessor testing system 42 includes a central processing unit (CPU) 30 coupled to chip set logic 32. Chip set logic 32 is coupled to a system bus 34 and a memory bus 36. A memory unit 44 is coupled to memory bus 36. A peripheral bus 40 is coupled to system bus 34. CPU 30 obtains data (i.e., reads) from memory unit 38 via chip set logic 32, and stores data (i.e., writes) to memory unit 38 via chip set logic 32. Chip set logic 32 functions as interface between CPU 30 and system bus 34, and between CPU 30 and memory unit 44. Chip set logic 32 preferably includes a memory controller. Memory unit 44 is configured to store data, and preferably includes semiconductor memory devices. Peripheral device 40 may be a disk drive unit, a video display unit, or a printer. Memory unit 44 includes only bus model 14, memory model 16, and test engine 18 of microprocessor test group 10. Microprocessor model 12 of microprocessor test group 10 is a hardware implementation, and is external to memory unit 44. Microprocessor model 12 remains coupled to bus model 14 and test engine 18 as described above. During use, microprocessor model 12 is caused to execute a testing program. The testing program includes a set of instructions which require operation of the feature and produce a result. The result produced by the microprocessor model is compared to an expected result.

Figure 5:
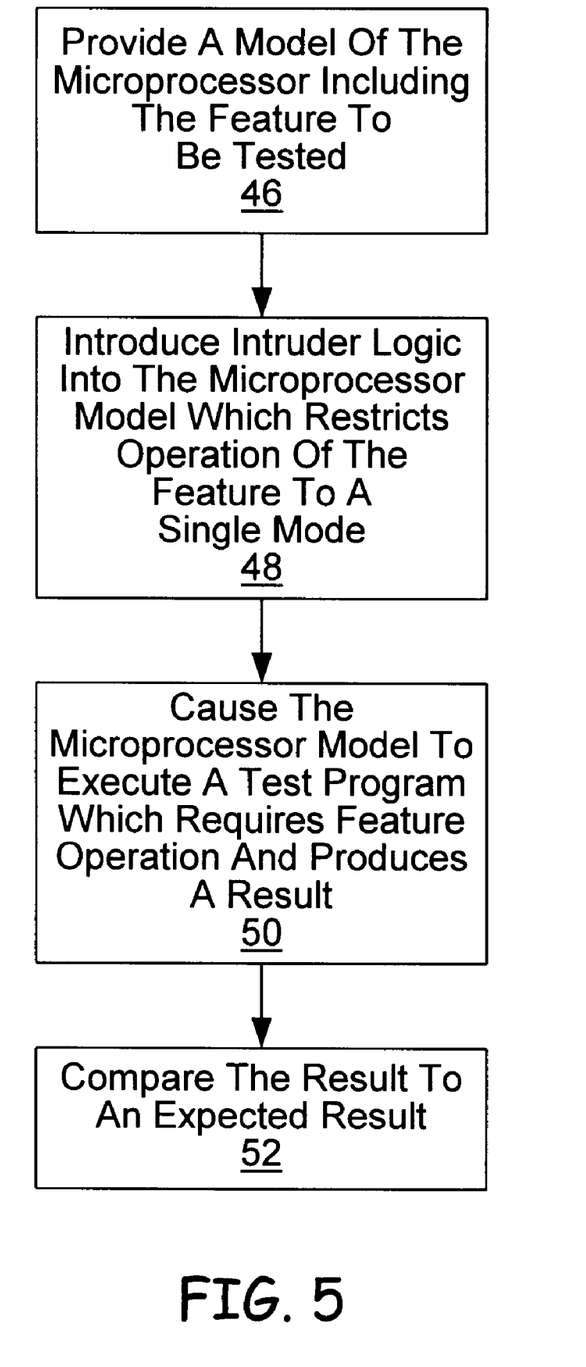
FIG. 5 is a flow chart of a method of testing a microprocessor feature in accordance with the present invention.

FIG. 5 is a flow chart of a method of testing a microprocessor feature in accordance with the present invention and will be used to summarize the present method. The feature operates in one of several operating modes as determined by the states of one or more control signals. During a first step 46, a model of the microprocessor including a representation of the feature to be tested is provided. As described above, the microprocessor model may be a software implementation or a hardware implementation. Intruder logic is introduced into the microprocessor model during a step 48. When the microprocessor model is a software implementation, the intruder logic includes a set of software instructions. When the microprocessor model is a hardware implementation, the intruder logic includes logic circuitry. The intruder logic functions as to restrict operation of the feature to a predetermined operating mode as described above. During a step 50, the microprocessor model is caused to execute a testing program. The testing program includes a set of instructions which require operation of the feature and produce a result. The result produced by the microprocessor model is compared to an expected result during a step 52. Any difference between the result produced by the microprocessor model and the expected result may indicate an error in feature hardware or in the control circuitry of the feature.

It will be appreciated to those skilled in the art having the benefit of this disclosure that this invention is believed to be capable of testing a feature of a microprocessor. Furthermore, it is also to be understood that the form of the invention shown and described is to be taken as exemplary, presently preferred embodiments. Various modifications and changes may be made without departing from the spirit and scope of the invention as set forth in the claims. It is intended that the following claims be interpreted to embrace all such modifications and changes.

What is claimed is:

1. A method of testing a feature of a microprocessor prior to the manufacture of the microprocessor, comprising:

forming a model which represents a microprocessor having at least one feature called upon by control signals dispatched to the feature within the model, wherein the feature can operate according to several modes of operation, and wherein the feature is a subsystem or functional unit for increasing the performance of the microprocessor;

interposing intruder logic between the control signals and the feature to restrict operation of the feature to only one of the several modes of operation;

initiating a testing program to activate the control signals for producing a test result from the feature in accordance with the one of the several modes of operation being selected; and comparing the test result with a predetermined result to determine if the feature fails the testing program.

2. The method as recited in claim 1, wherein the model comprises a file consisting essentially of a list of operational elements, interconnection between the elements, and a plurality of instructions configured to exercise the elements.

3. The method as recited in claim 1, wherein the model comprises a programmable logic device.

4. The method as recited in claim 2, wherein the intruder logic comprises a subset within the plurality of instructions.

5. The method as recited in claim 3, wherein the intruder logic comprises a portion of the programmable logic device.

6. A method for determining the overall operation of a feature within a microprocessor design, comprising:

providing a model which represents a microprocessor design, wherein the model includes a feature called upon by control signals dispatched to the feature within the model, wherein the feature is operably configured according to several modes of operation, and wherein the feature is a subsystem or functional unit for increasing the performance of the microprocessor;

interposing intruder logic between the control signals and the model to restrict operation of the feature to only one of the several modes of operation;

initiating a testing program to activate the control signals for producing a test result from the feature in accordance with the one of the several modes of operation being selected;

comparing the test result with a predetermined result to determine if the feature fails the testing program; and repeating the steps of initiating a testing program and comparing the test result for each of the several modes of operation to determine the overall operation of the feature.

7. The method as recited in claim 6, wherein the predetermined result comprises a result obtained from a functional specification of the microprocessor being represented by the model.

8. The method as recited in claim 6, wherein the feature comprises a representation of a hardware element employed as part of the microprocessor.

9. The method as recited in claim 8, wherein the hardware element comprises a cache system or a translation look-aside buffer subsystem.

10. The method as recited in claim 6, wherein the model comprises a VHDL software description of functional blocks used to form the microprocessor.

11. The method as recited in claim 10, wherein the intruder logic comprises a portion of the VHDL software description.

12. The method as recited in claim 6, wherein the model comprises a programmable logic device configurable to perform various functions of the feature in accordance with the several modes of operation.

13. The method as recited in claim 11, wherein the intruder logic comprises a portion of the programmable logic device.

14. A system for testing a feature of a microprocessor, comprising:

a CPU configured to execute instructions;

a system bus adapted for coupling to one or more peripheral devices;

a memory bus;

chip set logic coupled to the CPU, the system bus, and the memory bus; and a memory unit coupled to the memory bus and configured to store data, wherein the memory unit comprises a plurality of instructions configured to model the microprocessor, wherein the feature is a subsystem or functional unit for increasing the performance of the microprocessor, and wherein the feature comprises a subset of the plurality of instructions of the microprocessor model, and wherein the feature comprises a plurality of operating modes, and wherein the feature operates within one of the plurality of operating modes dependent upon the status of at least one binary control signals, and wherein the microprocessor model comprises intruder logic, and wherein the intruder logic comprises a plurality of instructions configured to alter the one or more binary control signals in order to restrict operation of the feature to one of the plurality of operating modes.

15. The system for testing a feature of a microprocessor as recited in claim 14, wherein the memory unit further comprises a memory model, and wherein the memory model comprises a plurality of instructions configured to store data.

16. The system for testing a feature of a microprocessor as recited in claim 15, wherein the memory unit further comprises a bus model, wherein the bus model is coupled between the memory model and the microprocessor model, and wherein the bus model comprises a plurality of instructions configured to transfer data between the microprocessor model and the memory model.

17. The system for testing a feature of a microprocessor as recited in claim 16, wherein the microprocessor model executes a testing program during testing of the feature.

18. The system for testing a feature of a microprocessor as recited in claim 17, wherein the memory unit further comprises a test engine, and wherein the test engine is coupled to the memory model, the bus model, and the microprocessor model, and wherein the test engine comprises a plurality of instructions configured to initiate execution of the testing program by the microprocessor model and to check for proper operation of the microprocessor model, the bus model, and the memory model during execution of the testing program.

19. A system for testing a feature of a microprocessor, comprising:

a CPU configured to execute instructions;

a system bus adapted for coupling to one or more peripheral devices;

a memory bus;

chip set logic coupled to the CPU, the system bus, and the memory bus;

a memory unit coupled to the memory bus and configured to store data; and a microprocessor model coupled to the memory unit and configured to model the microprocessor, wherein the feature comprises a portion of the microprocessor model, and wherein the feature is a subsystem or functional unit for increasing the performance of the microprocessor, and wherein the feature comprises a plurality of operating modes, and wherein the feature operates within one of the plurality of operating modes dependent upon the status of at least one binary control signal, and wherein the microprocessor model also comprises intruder logic, and wherein the intruder logic is configured to alter the one or more binary control signals in order to restrict operation of the feature to one of the plurality of operating modes.

20. The system for testing a feature of a microprocessor as recited in claim 19, wherein the microprocessor model comprises a programmable semiconductor logic device programmed to model the microprocessor.

21. The system for testing a feature of a microprocessor as recited in claim 20, wherein the intruder logic comprises a portion of the programmed programmable semiconductor logic device.

22. The system for testing a feature of a microprocessor as recited in claim 19, wherein the memory unit further comprises a memory model, and wherein the memory model comprises a plurality of instructions configured to store data.

23. The system for testing a feature of a microprocessor as recited in claim 22, wherein the memory unit further comprises a bus model, wherein the bus model comprises a plurality of instructions, and wherein the bus model is coupled between the memory model and the microprocessor model and is configured to transfer data between the microprocessor model and the memory model.

24. The system for testing a feature of a microprocessor as recited in claim 23, wherein the microprocessor model executes a testing program during testing of the feature.

25. The system for testing a feature of a microprocessor as recited in claim 24, wherein the memory unit further comprises a test engine, and wherein the test engine is coupled to the memory model, the bus model, and the microprocessor model, and wherein the test engine comprises a plurality of instructions configured to initiate execution of the testing program by the microprocessor model and to check for proper operation of the microprocessor model, the bus model, and the memory model during execution of the testing program.

* * * * *